(12) United States Patent
Reuter

(10) Patent No.: US 6,220,319 B1
(45) Date of Patent: *Apr. 24, 2001

(54) TIRE WITH TREAD CONTAINING ELECTRICALLY CONDUCTIVE STAPLES

(75) Inventor: René François Reuter, Burden (LU)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,970

(22) Filed: Oct. 19, 1998

(51) Int. Cl.[7] .............................. B29D 30/52; B60C 1/00; B60C 11/00; B60C 11/14

(52) U.S. Cl. .................................... 152/152.1; 152/209.4; 152/209.5; 152/211; 152/212; 156/114; 156/128.6

(58) Field of Search ............................. 152/152.1, 209.5, 152/DIG. 2, 210, 211, 212, 168, 169, 209.4; 156/114, 123, 124, 128.1, 128.6

(56) References Cited

U.S. PATENT DOCUMENTS

| | | | |
|---|---|---|---|
| 692,397 | * | 2/1902 | Wilkinson ............................ 152/211 |
| 1,797,545 | * | 3/1931 | Churcher . |
| 2,267,503 | * | 12/1941 | Lytle . |
| 2,605,199 | * | 7/1952 | Hawkinson ............................ 156/114 |
| 2,641,294 | * | 6/1953 | Bridgefield . |
| 3,314,839 | * | 4/1967 | Hough .............................. 152/209.5 |
| 4,031,990 | * | 6/1977 | Matsui et al. . |
| 4,826,381 | * | 5/1989 | Kiriyama . |
| 5,518,055 | * | 5/1996 | Teeple et al. ........................ 152/152.1 |
| 5,718,781 | * | 2/1998 | Verthe et al. ....................... 152/152.1 |
| 5,743,973 | * | 4/1998 | Krishnan et al. .................. 152/152.1 |
| 5,795,121 | * | 8/1998 | Tucker et al. . |
| 5,937,926 | * | 8/1999 | Powell ............................... 152/152.1 |
| 5,942,069 | * | 8/1999 | Gerresheim et al. .............. 152/152.1 |

FOREIGN PATENT DOCUMENTS

| | | | |
|---|---|---|---|
| 597008 | * | 3/1978 | (CH) .............................. 152/DIG. 2 |
| 4417914 | * | 11/1995 | (DE) . |
| 658452 | * | 6/1995 | (EP) ............................... 152/DIG. 2 |
| 732229 | * | 9/1996 | (EP) ............................... 152/DIG. 2 |
| 07876047 | | 1/1997 | (EP) . |
| 878330 | * | 11/1998 | (EP) ............................... 152/DIG. 2 |
| 1198271 | * | 12/1959 | (FR) . |
| 1251273 | * | 12/1960 | (FR) . |
| 1279913 | * | 11/1961 | (FR) . |
| 1546488 | * | 11/1968 | (FR) . |
| 2285258 | | 4/1976 | (FR) . |
| 166088 | | 9/1920 | (GB) . |
| 544757 | | 2/1941 | (GB) . |
| 57-194109 | * | 11/1982 | (JP) . |
| 62-191204 | * | 8/1987 | (JP) ................................... 152/209.4 |
| 1-293208 | * | 11/1989 | (JP) . |
| 3-7602 | * | 1/1991 | (JP) ................................... 152/209.5 |

OTHER PUBLICATIONS

Abstract for French 2285258.*

Abstract for Europe 787604.*

European Search Report.

* cited by examiner

Primary Examiner—Steven D. Maki
(74) Attorney, Agent, or Firm—Henry C Young, Jr.

(57) ABSTRACT

The invention relates to a rubber tire composed of carbon black reinforced rubber carcass with an outer, circumferential rubber tread construction of a rubber composition having a relatively high electrical resistivity. The tire tread construction has electrically conductive filament stapled through the tread construction and extending between the inner surface of the tread to its outer surface. An electrically conductive path is thereby created through the tread.

5 Claims, 3 Drawing Sheets

TIRE WITH TREAD CONTAINING ELECTRICALLY CONDUCTIVE STAPLES

FIELD OF THE INVENTION

The invention relates to a rubber tire composed of carbon black reinforced rubber carcass with an outer, circumferential rubber tread construction of a rubber composition having a relatively high electrical resistivity. The tire tread construction has electrically conductive filament stapled through the tread construction and extending between the inner surface of the tread to its outer surface. An electrically conductive path is thereby created from the outer surface of the tread to the carcass of the tire.

In practice, the bottom surface of the tread construction connects with at least one other carbon black reinforced rubber component of the tire carcass to thereby provide a relatively electrically conductive path from the outer surface of the tire tread to the bead portion of the tire and, thence, to a metal rim onto which the tire is designed to be mounted.

BACKGROUND OF THE INVENTION

Pneumatic rubber tires are conventionally prepared with a rubber tread which can be a blend of various rubbers which are, typically, sulfur-curable or sulfur-cured as the case may be, diene-based elastomers.

Sometimes the treads of rubber tires are prepared of a cap/base construction in which the outer portion of the tread is the cap and the underlying part of the tread between the tread cap and the supporting tire carcass, is its base. The cap portion is usually designed to be ground-contacting and, thus, have associated properties and the base portion generally overlays the tire carcass and is usually designed to support the cap, therefore, not to be ground-contacting. Such cap/base constructions are well known to those skilled in the art.

The rubber compositions for most components of a tire are typically reinforced with a substantial amount of carbon black reinforcing filler and, thereby, has a relatively low electrical resistivity for dissipating static electricity to the road from a moving vehicle which utilize such tires. It is believed that such phenomenon is well known to those having skill in such art.

However, it is sometimes desired to provide a tread of a rubber composition which contains a substantial amount of relatively non-electrically conductive reinforcing filler such as, for example, precipitated silica and, thereby, only a minor amount of carbon black reinforcement. Such a tread has a relatively high electrical resistivity and, thus, has a resistance to dissipating vehicular generated static electricity through the tire to the road. In practice, the relatively high electrical resistivity rubber composition may be the unitary tread, the tread cap and/or tread base. It is believed that such phenomenon is well known to those having skill in such art.

Various methods of providing paths of reduced electrical resistance to the outer surface of a tread cap have been suggested. For example, see U.S. Pat. Nos. 1,797,545; 2,267,503 and 2,641,294; and the following patent publications: French 1,198,271; 1,251,273; 1,279,913 and 1,546,488; Germany DE 44 17914; Swiss 597,008 and Japanese 57-194,109 and 1-293,208.

Accordingly, for a tire tread construction where unitary tread composition, or tread cap and/or tread base rubber composition has a relatively high electrical resistivity, it is desirable to provide a suitable path of relatively low electrical resistance from the outer surface of the tire tread to the inner surface of the tire tread, or in a case of a tire of cap/base construction, to the inner surface of the tread cap or tread base, as the case may be.

As used herein, the terms "substantially, or quantitatively, reinforced with reinforcing fillers which are electrically relatively non-conductive such as, for example, silica", and the like are generally used in conjunction with a tire tread, or tread cap and/or tread base in the case of tread of cap/base construction, which contains about 30 to about 100, sometimes preferably about 30 to about 90 phr, of electrically non-conductive filler, and only a minimal amount, if any, of carbon black in which the carbon black is present in not more than about 20 phr. Sometimes, the ratio of non-conductive filler to carbon black may be at least 2/1 and sometimes even at least 10/1.

By the term "carbon black" reinforced, it is meant that the rubber components of the tire carcass rubber which are carbon black reinforced, contain a quantitative amount of carbon black reinforcement, normally at least 25 phr, and a minimal amount, if any, of relatively non-electrically conductive reinforcing filler such as, for example, silica. The weight ratio of carbon black to such non-conducting filler might be, for example, at least 5/1.

A footprint of a tire tread is that portion of the tread which is intended to contact the ground when in use. Such footprint, insofar as the description of this invention is concerned, refers to the tire tread whether or not the tire is mounted on a rim or on a vehicle under loaded conditions.

The term "phr" as used herein, and according to conventional practice, refers to "parts of a respective material per 100 parts by weight of rubber". In the description herein, rubber and elastomer are used interchangeably.

In the description herein, the term "vulcanized" or "vulcanizable" may, on occasion, be used interchangeably with the terms "cured" and "curable".

SUMMARY AND PRACTICE OF THE INVENTION

In accordance with this invention, a pneumatic tire is provided having a circumferential rubber tread of a rubber composition having a high electrical resistivity; wherein the outer surface of the tread is designed to be ground-contacting, and wherein said rubber composition of the tread has a high electrical resistivity as evidenced by a tire electrical resistivity of at least 20,000 meg-ohms according to Test WDK 110; characterized in that said tread has a plurality of electrically conductive, filaments stapled through said tread having the ends of the stapled filaments terminating at the tread's outer surface, to form an electrically conductive path from the outer surface to the inner surface of the tread; wherein the tire with said tread containing the said stapled filaments has an electrical resistivity in a range of about one ohm to about ten thousand mega ohms according to Test WDK 110.

Therefore, the above description is for a first characterization of the tire with a tread having a high electrical resistivity without an electrically conductive staple applied through the tread, thus, presenting a tire having a high electrical resistance, and a second characterization of the same tire having the electrically conductive staple which is stapled through the tread, thus, presenting a tire having a substantially lower electrical resistance.

In further accordance with this invention, a tire is provided which is composed of a carbon black reinforced rubber carcass having two individual sidewalls, and two spaced apart bead portions and a circumferential rubber tread juxtapositioned to said carcass of (a) a unitary composition construction of a rubber composition containing less than 20 phr of carbon black or of (b) a cap/base construction, preferably a co-extruded cap/base construction; wherein said tread cap and/or tread base rubber composition contains less than 20 phr of carbon black; wherein the outer surface of the unitary tread, or tread cap as the case may be, is designed to be ground-contacting, and wherein said rubber composition(s) have a high electrical resistivity as evidenced by the tire having an electrical resistivity of at least 20,000 meg-ohms according to Test WDK 110; characterized in that said tread has a plurality of unconnected, individual, electrically conductive, spaced apart, open loops of stapled filaments through said tread, and extending around the periphery of said tire, said individual loops of cords having a segment extending over a portion of the inner surface of the tread and having their ends terminating at the outer surface of said tread to form an electrically conductive path from the inner surface of the tire and the tire carcass to the outer surface of the tread intended to ground-contacting; wherein said tire having the stapled tread has an electrical resistivity in a range of about one ohm to about 10,000 mega-ohms according to Test WDK 110.

The stapled filaments may be described as a series of individual, separate, unconnected open loops of filaments which extend circumferentially around the tire tread and which may be created, for example, by stapling a plurality of filaments from the inner surface of the unvulcanized tread stock to the outer surface of the tread; wherein the open ends of a filament loop are terminated at the footprint of the molded and vulcanized tire tread intended to be road-contacting.

Such stapling of the filament may be accomplished, for example, with a stapling gun or other suitable machine which would be well known to one having skill in such art.

In further accordance with this invention, a method of preparing a tire is provided which comprises (A) stapling an electrically conductive filament through a rubber tread stock of a unitary composition or of a cap/base construction to form a plurality of unconnected, spaced apart, open loops of the filament and where, for said loops, a segment of said filament in a loop extends over a portion of the inner surface of the tread stock; wherein the ends of the stapled filament in a loop terminates at the outer surface of the tread stock, (B) applying said stapled tread stock to a carbon black reinforced rubber tire carcass to form an assembly thereof, (C) molding and curing the resulting assembly in a suitable mold at a temperature of about 150° C. to about 185° C. to form a tire having said plurality of unconnected, spaced apart staples in its tread portion around the periphery of the tire and extending from the outer surface of its tread to its underlying carcass.

In one significant aspect of the process of stapling of the filament through the unvulcanized tread stock is that the stapling can be specifically placed, or positioned, at a desired location in the tread stock which will eventually become a tread rib or a tread lug which is designed to be ground-contacting.

Accordingly, a process is provided wherein the stapling of the filament is positioned in the tread stock by indexing the staple placement with a predetermined location of a tire tread rib or tire tread lug designed to be ground-contacting and to be formed as the tire carcass/tread stock assembly is molded and cured.

In one aspect of the invention, the relatively insulative (high resistivity) rubber composition portion of said tread may contain about 30 to about 100 phr of electrically non-conductive reinforcing fillers such as, for example, precipitated silica and from zero, or about 5 phr to about 20 phr of carbon black.

In one aspect, it is sometimes preferable that, for the relatively electrically insulative (high resistivity) rubber composition of the tire tread, the weight ratio of silica to carbon black, if carbon black is used, is at least about 1.2/1 and preferably at least 2/1, and sometimes at least 10/1.

Various materials may be used for the filament for this invention so long as it is electrically conductive. For example, such filament may be comprised of various metals (or alloys thereof) such as, for example, copper, steel, brass coated steel, and copper coated steel as well as carbon fiber composites. It may also be in a form of a wire comprised of such metals.

The filament may be a monofilament or it may be of cabled (twisted) multiplicity of filaments. Such filament(s) may be comprised of at least one metallic component.

For example, it may be an electrically conductive metal wire as a monofilament or of a multiplicity of cabled metal filaments.

The WDK 110 Test is a procedure to measure the electrical resistance of a tire mounted on an electrically conductive metal rim (ie: a steel rim). In the Test, the footprint of the tire tread is pressed against an electrically conductive metal plate (i.e.: a steel plate). The plate and the rim are connected via copper wires to an instrument. A voltage is applied and the electrical resistance between the plate and the rim is read from an ohmmeter on the instrument. A reference to the WDK 110 Test may be found in *WDK Leitlinien Index* (May, 1998).

As hereinbefore pointed out, the filament (i.e.: wire) may be stapled through the tread construction by various methods and, it is desirable that the filament is mechanically stapled by suitable automated machine, usually from the inner surface of the tread construction.

While not limited thereto, various diene-based elastomers and combinations thereof may be used in the tire tread construction components (i.e.: the unitary tire tread, tread cap and tread base).

Such diene-based elastomers may include homopolymers and copolymers of conjugated diene hydrocarbons and copolymers of conjugated dienes and aromatic vinyl compounds such as, for example, styrene and alpha-methylstyrene. Representative of various dienes are, for example, isoprene and butadiene. Representative of various elastomers are, for example, cis 1,4-polyisoprene (natural and synthetic), cis 1,4-polybutadiene, styrene/butadiene copolymers as emulsion polymerization prepared copolymers and as organic solution polymerization prepared copolymers, isoprene/butadiene copolymers, styrene/isoprene copolymers, 3,4-polyisoprene, relatively high vinyl polybutadiene containing about 30 to about 85 percent vinyl content and styrene/isoprene/butadiene terpolymers.

In practice, the tire may be constructed, in part, by building an extruded tread stock onto a rubber tire carcass. Such construction and building process are well known to those having skill in such art.

Tire assembly is vulcanized in a suitable mold under conditions of elevated temperature, for example, in a range of about 140° C. to about 180° C.

The stapled electrically conductive filament (i.e.: an electrically conductive metal wire) through at least one tire tread component provides a path of relatively low electrical resistance, as compared to a tire tread with relatively high electrical resistance and, thus, a path for dissipation of static electricity between the ground and the tire bead portion and, thence, the metal rim of the vehicular wheel on which the tire may be mounted.

In practice, after the outer surface of the tire tread, as it is used in service, becomes worn so that a portion of the electrically conductive filament is also at least partially worn away, the path for dissipation of static electricity is considered herein as maintained by the exposed portion(s) of the residual filament on the outer surface of the tread so that at least a portion of the filament ends are able to touch the ground during contact of the tire tread with the ground during the rotation of the tire.

The accompanying drawings are provided for further understanding of the invention, although it is not intended that the invention be limited to the presentation of the drawings.

IN THE DRAWINGS

FIG. 3 represents a cross-section of the tread stock taken at section 3A—3A of FIG. 1 in which FIG. 3 depicts the filament (wire) being stapled through the tread stock.

Figure 1:
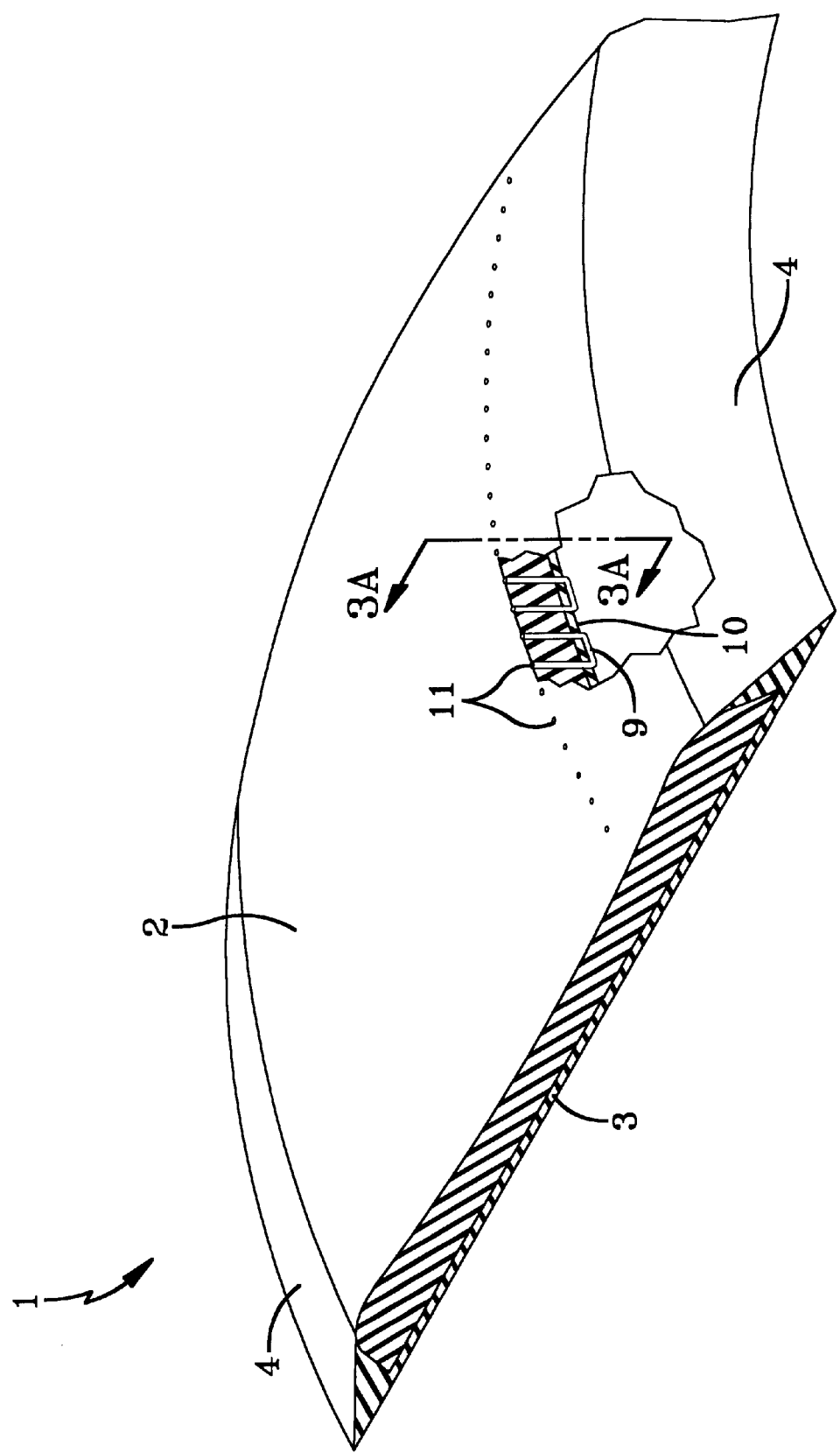
FIG. 1 is a perspective, cross-sectional view of a tire tread stock composite of cap and tread base components together with an electrically conductive filament (i.e.: a copper wire for this example) stapled through the tread stock. It is to be understood that, alternatively, the tread stock may be of a unitary rubber composition instead of a cap/base construction.

Referring to the drawings, a cross-section of unvulcanized rubber tread stock (1) is shown having portions which will become, after building the tire and upon shaping and vulcanizing the tire in a suitable mold, a tread cap (2) having, for this exemplary drawing, a high electrical resistance, and normally designed to be ground-contacting, a tread base (3) (unless the tire tread stock is of a unitary rubber composition) which underlies the tread and tread wings (4), or what are sometimes referred to as "miniwings", outboard of both the tread cap (2) and tread base (3) and which overlap a portion of the sidewall (5). It is to be understood that, alternatively, the sidewall (5) may overlap the outer surface of the miniwings (4) although, for the purposes of this invention, such construction is not preferred.

Figure 3:
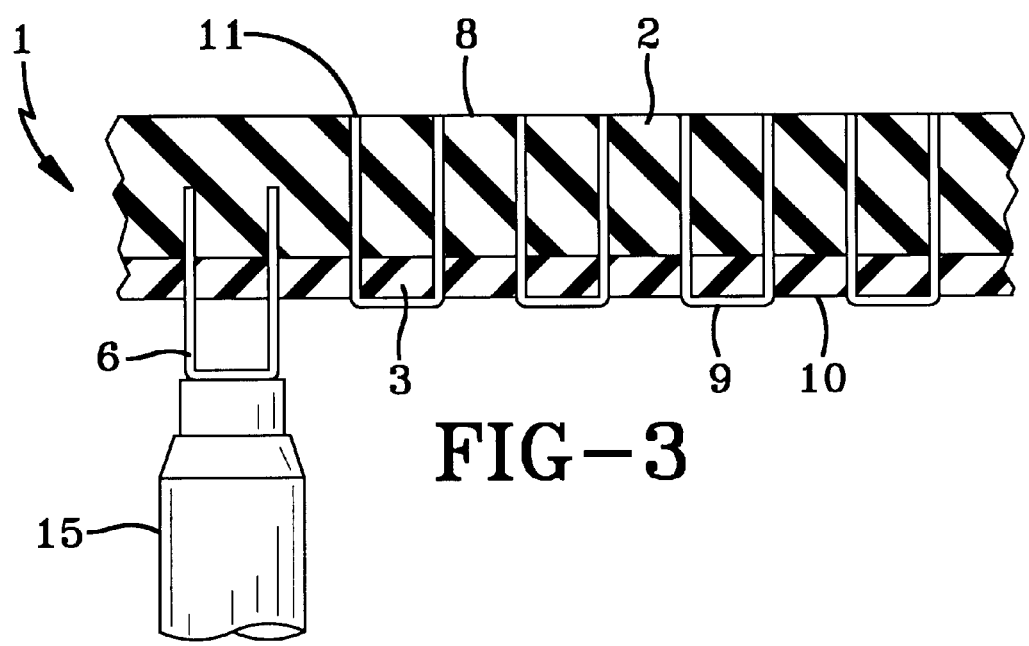

The wire (6) is shown as being stapled through the body of the tread stock (1) and, thus, through both the tread base (3) and tread cap (2) to staples having their ends terminating at the outer surface of the tire tread.(FIG. 3).

For the stapling of the wire through the tread stock, the wire (6) is shown as being stapled from the inner surface (10) of the tread construction so that the ends of the wire (11) are exposed to the outer surface (8) of the tread cap (2) to form a series of unconnected open loops of the wire (6). It is thereby contemplated that the wire (6) does not extend over a portion of the aforesaid outer surface (8) but that individual, unconnected, open loops are formed in which only the ends of the wire extend to the outer surface (8) of the tread stock (2).

In this manner, and for this example, the stapled wire is shown to provide an electrically conductive path of relatively low electrical resistivity from the outer surface (8) of the tread cap (2) of relatively high electrical resistivity to the inner surface of the tread base (10).

While the miniwings (4) in FIG. 1 are depicted as being individual rubber components of the tread stock (1), it is to be understood that the miniwings (4) can actually be a unitary extension and the same rubber composition of the tread base (2).

It is to be appreciated that the tread cap (2) of FIG. 1 is substantially reinforced with relatively non-conductive reinforcing filler such as, for example, although not limited to silica, namely for this drawing about 20 to about 90 phr of non-conductive reinforcing filler, with only a minor amount of carbon black (i.e.: about 20 or less phr).

Thus, the tread cap (2) has a relatively high electrical resistivity and the stapled wire (6) thereby provides a path of reduced electrical resistivity through the tread stock (1).

For the tread construction of this example, all of the tread components, namely the tread base (2), tread cap (1), and the miniwings (4), in general practice may, for example, be co-extruded together in a multiplex extruder to form the tread strip composite (1).

Figure 2:
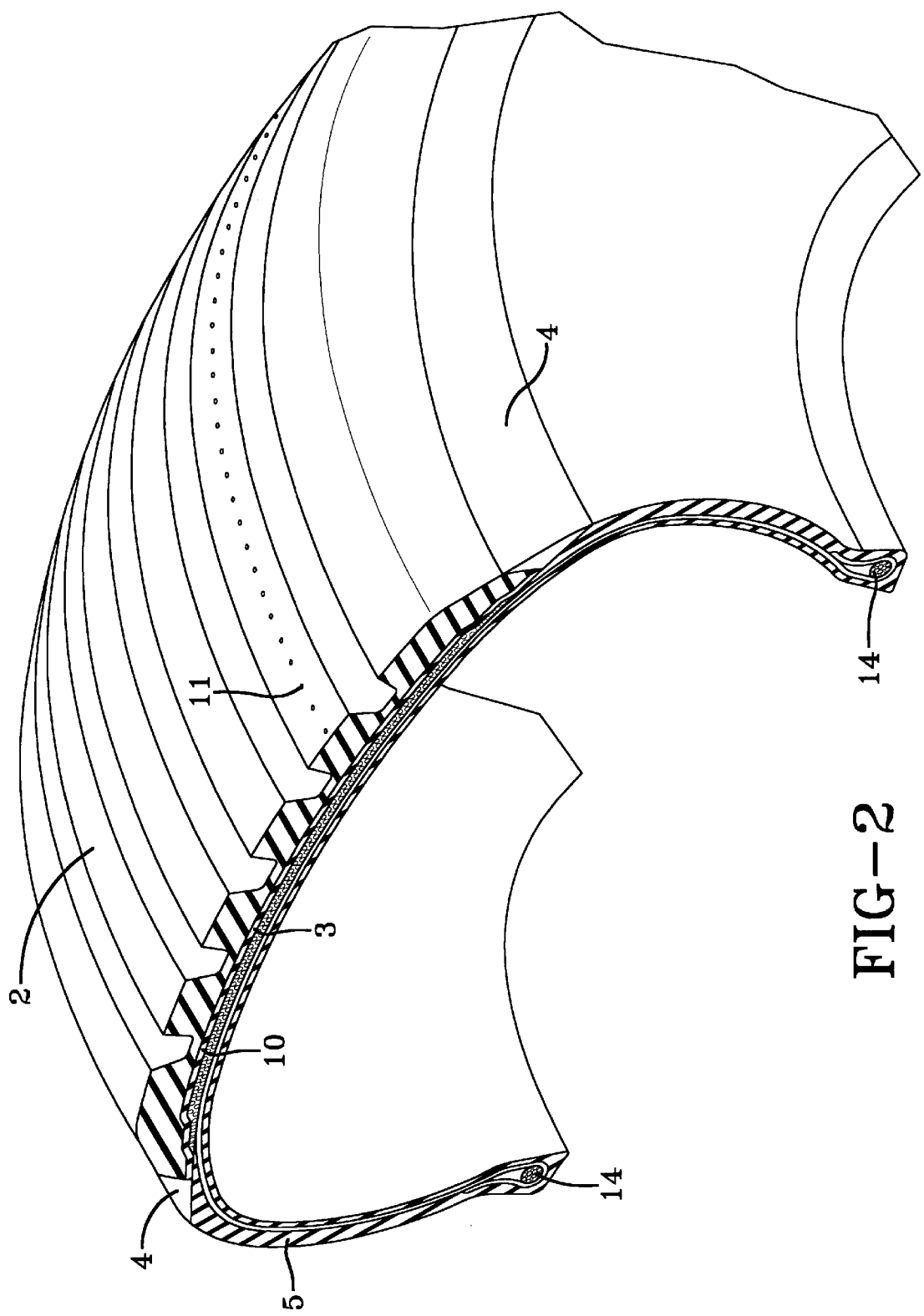
FIG. 2 is a perspective, cross-sectional view of a molded and vulcanized tire with a tread of a rib and groove design of a cap/base construction together with the filament (wire) stapled through the tread stock. It is to be understood that, alternatively, the tread stock may be of a unitary rubber composition instead of a cap/base construction.

The tire construction is shaped and vulcanized in a suitable mold to form a tire (12) with the ends or the stapled wire (6) terminating on the outer surface of a rib (13) of the tread cap (2), with one example of the stapled version being shown in FIG. 2.

As the tire, having been mounted and inflated on a suitable electrically conductive rigid metal rim, and the rim mounted on a wheel of a vehicle, rolls across the ground, a path for electrical dissipation, is created between the rim to the outer surface (8) of the rib (13) of the tread cap (2) and, thereby, the ground, by the aforesaid stapled wire (6) as it contacts the road.

It is contemplated that, as the outer surface of the tread cap (2) on the outer, ground-contacting surfaces of the tread rib (13) wears away, a portion of the wire (6) also wears away yet still leaving a portion of the wire (6) to contact the road surface.

The creation of an electrically conductive path from the outer surface of a relatively electrically non-conductive tread by stapling of an electrically conductive filament is believed to be novel and inventive. In practice, the filament may be customized by varying its diameters and selection of various metals various flexibilities and compatabilities with the rubber compositions, as well as various electrical resistivities, depending somewhat upon the rubber compositions themselves and the intended use and service of the tire tread itself.

A significant novelty is considered herein to be that the concept of the stapling of the electrically conductive filament through the tread stock does not introduce significant penalties on tire tread stock extrusion capabilities, minimal if any, compromises for the tire tread rubber compositions and without complicated additional tire building steps (the building of the tread onto the tire carcass).

A further aspect of the novelty of this invention is that it enables a flexibility in both the positioning of the stapled filament in prescribed locations across the width of the tread and circumferentially around the periphery of the tread.

In practice, while various electrically non-conductive reinforcing fillers may be used for the tire tread component (s), exemplary of such fillers is silica, although it is to be understood that the practice of this invention is not intended to be limited to silicas as being the only suitable non-conductive reinforcing filler.

Representative of silica fillers, for example and not intended to be limiting, are precipitated silicas. Use of such silicas in the reinforcement of rubber compositions is well known to those having skill in such art.

Representative of various precipitated silicas are those, for example and without limitation, available from PPG Industries under the Hi-Sil trademark with designations 210, 243, etc; silicas available from Rhone-Poulenc such as, for example, Zeosil 1165MP and silicas available from Degussa AG with designations such as, for example, VN2, VN3, and BV3370GR and from J. M. Huber as Zeopol 8746.

When silica reinforcement, particularly quantitative silica reinforcement, is desired for a rubber tire tread, particulate, precipitated silica is conventionally used with a coupling agent, or what is sometimes referred to as a "silica coupler".

Compounds capable of reacting with both the silica surface and the rubber elastomer molecule, in a manner to cause the silica to have a reinforcing effect on the rubber, are generally known to those skilled in such art as coupling agents, or couplers, are often used.

Numerous coupling agents are taught for use in combining silica and rubber such as, for example, silane coupling agents containing a polysulfide component, or structure, such as for example bis -(3-trialkoxysilylalkyl) polysulfides where the alkyl radicals of the alkoxy groups are preferably selected from methyl and ethyl radical, the alkyl radicals for the silylalkyl component is preferably selected from ethyl, n-propyl and butyl radicals.

The tire can be built, shaped, molded and cured by various methods which will be readily apparent to those having skill in such art.

The invention may be better understood by reference to the following examples in which the parts and percentages are by weight unless otherwise indicated.

EXAMPLE I

This Example is presented to illustrate a concept of the invention.

Samples A and B, with Sample A being a control, are a co-extruded tread stock of cap/base construction and corresponding pneumatic rubber tires (A and B) of a 265/35R18 type and size with such tread stocks. All of the tires have identical carbon black reinforced rubber carcasses with associated beads and sidewalls.

All of the treads have the same vulcanized tread design, or surface configuration, of lugs and grooves.

In particular and for this Example, tires A and B have a tread construction composed of a co-extrusion of (i) a tread cap and (ii) tread base; wherein the tread cap rubber is quantitatively reinforced with silica and containing a minimal amount of carbon black and where the tread base is quantitatively reinforced with carbon black.

A multiplicity of staples of an electrically conductive monofilament are stapled through the Sample B from its inner surface, leaving the ends of the filament terminated and exposed on the outer surface of the Sample B prior to building the Sample B onto a tire carcass, similar to FIG. 3.

The filament has a diameter of about 0.1 to about 0.5 millimeters.

All of the tires, after vulcanization in a suitable mold, have a tread of a rib and groove configuration and the staples are positioned in the tread rib.

In this manner, a path of reduced electrical resistance is provided via the staples from the outer surface of the tread (i.e.: the tread rib) to the inner surface of the tread, and thereby to a carbon black reinforced tire carcass which supports the tread.

The composition for the tread cap contains the materials shown in the following Table 1. The tread base is composed of natural rubber, cis 1,4-polybutadiene and is reinforced with carbon black.

The aforesaid co-extruded treads are suitably built onto the tire carcasses and the assembly thereof vulcanized in a tire mold at a temperature of about 160° C. for about 15 minutes to form cured pneumatic tires with tread configurations of ribs and grooves.

TABLE 1

(Tread Cap)

| For Tires A and B | Parts |
|---|---|
| Non-Productive Mix Stages | |
| E-SBR[1] | 25 |
| Isoprene/Butadiene[2] Rubber | 45 |
| Cis 1,4-polybutadiene[3] | 20 |
| Natural Rubber[4] | 10 |
| Processing Aids[5] | 25 |
| Fatty Acid | 2 |
| Silica[7] | 80 |
| Carbon Black, Tread Type | 0 |
| Coupling Agent[8] | 12 |
| Productive Mix Stage | |
| Sulfur | 1 |
| Zinc Oxide | 4 |
| Antioxidant(s)[6] | 3 |
| Sulfenamide and Thiuram Type Accelerators | 4 |

[1]Emulsion polymerization prepared SBR of The Goodyear Tire & Rubber Company having styrene content of about 40 percent.
[2]Isoprene/butadiene copolymer elastomer having a Tg of about −45° C. and an isoprene content of about 50 percent, a product of The Goodyear Tire & Rubber Company.
[3]Cis 1,4-polybutadiene rubber obtainable as BUDENE ® 1207 from The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 15 parts additional rubber processing oil, plasticizers, resins and waxes are added.
[6]Of the di-aryl paraphenylene diamine and dihydro-trimethyl quinoline type.
[7]A silica obtainable as Zeosil 1165MP from Rhone-Poulenc.
[8]Obtainable as bis-(3-triethoxysilylpropyl) tetrasulfide (50% active) commercially available as X50S from Degussa as a 50/50 blend of the tetrasulfide with N330 carbon black (thus, considered 50% active).

It is considered herein that it is demonstrated that a path of reduced electrical resistance can be provided through a tire tread by use of staples of an electrically conductive filament.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire composed of a carbon black reinforced rubber carcass having two individual sidewalls, and two spaced apart bead portions and a circumferential rubber tread juxtapositioned to said carcass of (a) a unitary rubber composition containing less than 20 phr of carbon black or of (b) a cap/base construction; wherein said tread cap and/or tread base includes a rubber composition containing less than 20 phr of carbon black; wherein the outer surface of the unitary tread, or tread cap, is designed to be ground-contacting, and wherein said rubber composition(s) have a high electrical resistivity as evidenced by the tire having an electrical resistivity of at least 20,000 mega-ohms according to Test WDK 110 in the absence of hereinafter provided stapled filaments; characterized in that said tread has a plurality of unconnected, individual, electrically conductive, spaced apart, open loops of stapled filaments through said tread, and extending around the periphery of said tire, said loops of filaments having a segment extending over a portion of the inner surface of the tread and having their ends terminating at the outer surface of said tread to form an electrically conductive path from the inner surface of the tire and the tire carcass to the outer surface of the tread intended to ground-contacting; wherein said tire having the stapled tread has an electrical resistivity in a range of about one ohm to about 10,000 mega-ohms according to Test WDK 110; wherein said stapled filaments consist essentially of carbon fibers and are exclusive of metal wires.

2. The tire of claim 1 wherein the filament is a monofilament.

3. The tire of claim 1 wherein the said filament is a multiplicity of twisted filaments.

4. The tire of claim 1 wherein said tread is of a unitary rubber composition containing less than 20 phr of carbon black.

5. The tire of claim 1 wherein said tread is of a cap/base construction wherein said tread cap rubber composition contains less than 20 phr of carbon black.

* * * * *